United States Patent
Kristofek et al.

(10) Patent No.: US 9,306,252 B2
(45) Date of Patent: Apr. 5, 2016

(54) DYNAMIC PRESSURE CONTROL IN A BATTERY ASSEMBLY

(75) Inventors: Grant W. Kristofek, Wayland, MA (US); Serge R. Lafontaine, Lincoln, MA (US); Ian W. Hunter, Lincoln, MA (US)

(73) Assignee: NUCLEUS SCIENTIFIC, INC., Cambridge, MA (US)

( * ) Notice: Subject to any disclaimer, the term of this patent is extended or adjusted under 35 U.S.C. 154(b) by 0 days.

(21) Appl. No.: 13/493,592

(22) Filed: Jun. 11, 2012

(65) Prior Publication Data

US 2013/0330577 A1   Dec. 12, 2013

(51) Int. Cl.
| | |
|---|---|
| *H01M 10/48* | (2006.01) |
| *H01M 10/44* | (2006.01) |
| *H02J 7/00* | (2006.01) |
| *H01M 10/6557* | (2014.01) |
| *H01M 2/10* | (2006.01) |
| *H01M 10/42* | (2006.01) |
| *H01M 10/625* | (2014.01) |
| *H01M 10/647* | (2014.01) |
| *H01M 10/6568* | (2014.01) |
| *H01M 10/052* | (2010.01) |

(52) U.S. Cl.
CPC ........ *H01M 10/6557* (2015.04); *H01M 2/1077* (2013.01); *H01M 10/4207* (2013.01); *H01M 10/441* (2013.01); *H01M 10/445* (2013.01); *H01M 10/482* (2013.01); *H01M 10/625* (2015.04); *H01M 10/647* (2015.04); *H01M 10/6568* (2015.04); *H01M 10/052* (2013.01); *H01M 2220/20* (2013.01)

(58) Field of Classification Search
USPC ......................................... 429/61, 66, 50, 54
See application file for complete search history.

(56) References Cited

U.S. PATENT DOCUMENTS

| | | | | |
|---|---|---|---|---|
| 5,879,831 | A * | 3/1999 | Ovshinsky et al. | 429/54 |
| 7,270,910 | B2 * | 9/2007 | Yahnker et al. | 429/62 |
| 2012/0189879 | A1 * | 7/2012 | Fetzer et al. | 429/50 |

FOREIGN PATENT DOCUMENTS

| | | | | |
|---|---|---|---|---|
| DE | 10-2009035482 | * | 2/2011 | H01M 2/10 |

* cited by examiner

*Primary Examiner* — Ula C Ruddock
*Assistant Examiner* — Osei Amponsah
(74) *Attorney, Agent, or Firm* — Occhiuti & Rohlicek LLP

(57) ABSTRACT

Operating a battery assembly that includes one or more rechargeable battery cells includes: monitoring one or more operational parameters of the battery cells; and dynamically controlling pressure applied to the one or more battery cells based at least in part on one or more of the monitored operational parameters.

9 Claims, 6 Drawing Sheets

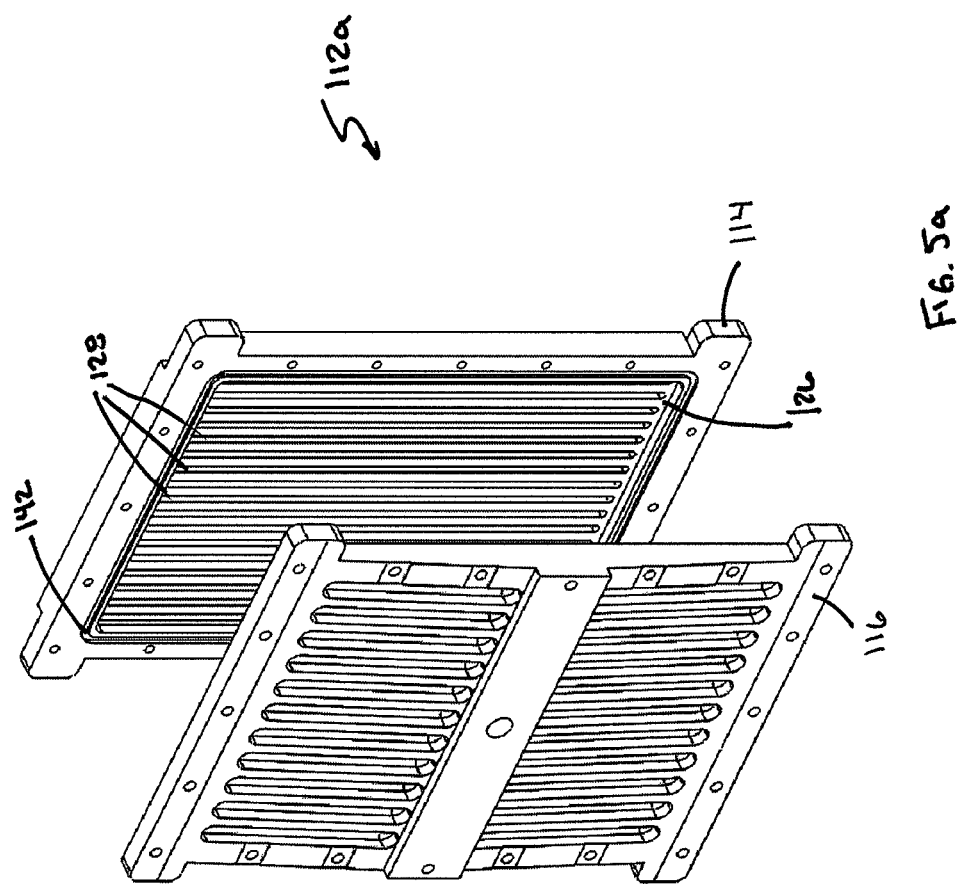

DYNAMIC PRESSURE CONTROL IN A BATTERY ASSEMBLY

BACKGROUND

High performance rechargeable batteries, such as Li-ion batteries, are widely used to power electric vehicles. One operating characteristic that affects the performance of such batteries is the pressure experienced by the battery cells within a battery assembly. Some battery assemblies include a stack of battery cells compressed using a structure that maintains a relatively constant pressure on the battery cells within the stack. In the case of pouch cells with no metal enclosure, this also provides the required support for the cell. This pressure is selected to achieve optimum performance of the cells and is typically specified by the manufacturer of the cells. For example, for some cells with a capacity of around 14-20 Ah, the recommended pressure is about 35-50 kPa. In some cases, the pressure specified by the manufacturer is designed to prevent delamination of the cells during use.

SUMMARY

In one aspect, in general, a method of operating a battery assembly that includes one or more rechargeable battery cells includes: monitoring one or more operational parameters of the battery cells; and dynamically controlling pressure applied to the one or more battery cells based at least in part on one or more of the monitored operational parameters.

Aspects can include one or more of the following features.

The battery assembly includes a plurality of rechargeable battery cells and wherein dynamically controlling pressure involves dynamically controlling pressure applied to the plurality of battery cells.

Dynamically controlling the pressure comprises controlling the pressure applied to the plurality of battery cells as a function of one or more of the monitored operational parameters.

The method further includes cooling the battery cells by flowing coolant between neighboring battery cells.

Dynamically controlling the pressure comprises modulating pressure of the coolant flowing between neighboring battery cells.

Modulating pressure of the coolant flowing between neighboring battery cells comprises changing a flow rate of the coolant flowing between neighboring battery cells.

Dynamically controlling the pressure comprises applying a bias pressure to the battery cells and modulating pressure applied to the plurality of battery cells relative to the bias pressure.

At least one of the operational parameters is charging rate, state of charge, or temperature of the cells.

At least one of the operational parameters is charging rate.

Monitoring the one or more operational parameters includes monitoring a change in at least one of the operational parameters during charging of the battery cells.

The method further comprises detecting a change in a volume of a coolant region within the battery assembly.

In another aspect, in general, an apparatus includes: one or more rechargeable battery cells; at least one sensor configured to monitor one or more operational parameters of the battery cells; and a pressure control system configured to dynamically control pressure applied to the one or more battery cells based at least in part on one or more of the monitored operational parameters.

Aspects can include one or more of the following features.

The one or more rechargeable battery cells is a plurality of battery cells.

The pressure control system is configured to control the pressure applied to the plurality of battery cells as a function of one or more of the monitored operational parameters.

The pressure control system comprises: a rigid housing with the plurality of battery cells contained with the rigid housing; and a pressure modulator configured to modulate pressure applied to the plurality of battery cells to control pressure applied to the plurality of battery cells.

The pressure control system further comprises one or more pressure sensors configured to monitor pressure applied to the plurality of battery cells.

The pressure control system further comprises control circuitry configured to receive input from the one or more pressure sensors and to provide a modulation signal to the pressure modulator.

The apparatus further includes a coolant system including a plurality of coolant flow plates interleaved among the plurality of battery cells.

The pressure modulator is configured to modulate pressure of coolant flowing through the plurality of coolant flow plates so as to modulate pressure applied to the battery cells among the plurality of battery cells.

The pressure modulator comprises a pump for flowing coolant through the plurality of coolant flow plates and wherein the pressure modulator is configured to change a flow rate of the coolant flowing through the plurality of coolant flow plates so as to modulate the pressure applied to the plurality of battery cells.

At least one of the operational parameters is charging rate, state of charge, or temperature of the cells.

At least one of the operational parameters is charging rate and wherein the pressure control system is configured to dynamically control pressure applied to the plurality of battery cells as a function of the charging rate.

The apparatus further includes a sensor for detecting a change in a volume of a coolant region within the battery assembly.

The sensor comprises a diaphragm or a piston.

Aspects can have one or more of the following advantages.

As mentioned above, some battery assemblies include a stack of battery cells compressed using a structure that maintains a relatively constant pressure on the battery cells within the stack. (See, for example, U.S. Ser. No. 13/445,458, entitled "A Multi-Cell Battery Assembly", incorporated herein by reference.) The performance and/or longevity of rechargeable battery cells can be improved by dynamically controlling the pressure that is applied to the cells during operation (e.g., during charging and/or discharging) of the battery cells. For example, increasing the pressure applied to the battery cells during ultra-fast charging helps to prevent delamination or damage to the cells. For Li-ion pouch cells, which can undergo a 5-10% swelling per 500 cycles, this mechanism also prevents cells from being over-pressurized. It is also desirable in pouch cells to minimize stresses and bending as part of the mounting. The cell pressure should also be uniform over the pouch, which can be achieved with a pressure control system. Incorporating portions of a pressure control system into a coolant system for a battery assembly facilitates the ability to evenly control the pressure applied to different battery cells within a stack and across the surface of each battery cell. Since a coolant system may be needed anyway, the pressure control system can make use of features of the coolant system to accomplish both goals (pressure control and temperature control) in an efficient way. In some operating environments, such as in electric vehicles, the batteries can experience exceptionally high loads as a result of, for example, rapid acceleration or rapid breaking. Such high loads can generate large electrical currents, which in turn may result in a significant warming of the Li-ion cells due to their internal resistance. The temperature of the cells can be controlled by interleaving layers between the battery cells that contain a flow of coolant that dissipates some of the generated heat. In the case of Li-ion batteries, for example, achieving efficient operation calls for the battery cells to be operated within a specific temperature range. At operating temperatures greater than about 40° C., the life span of the battery can be significantly reduced. In addition, the temperature gradient among cells in a multi-cell battery should be no greater than about 5-10 degrees centigrade. The interleaved flow plates define an array of parallel flow channels through which coolant is passed both to cool the battery cells and to control the pressure applied to the battery cells, with respect to a bias pressure. The coolant is confined within the channels defined by the flow plates and thus does not come into direct contact with the battery cells.

Monitoring pressure and volume changes also allows the early detection of gas buildup in pouches and the prevention of failure.

Other features and advantages of the invention are apparent from the following description, and from the claims.

DESCRIPTION OF DRAWINGS

FIGS. 5A and 5B show front and back views, respectively, of the cover plate and back plate, which make up the manifold from the battery assembly of FIGS. 2A and 2B.

DESCRIPTION

Figure 1:
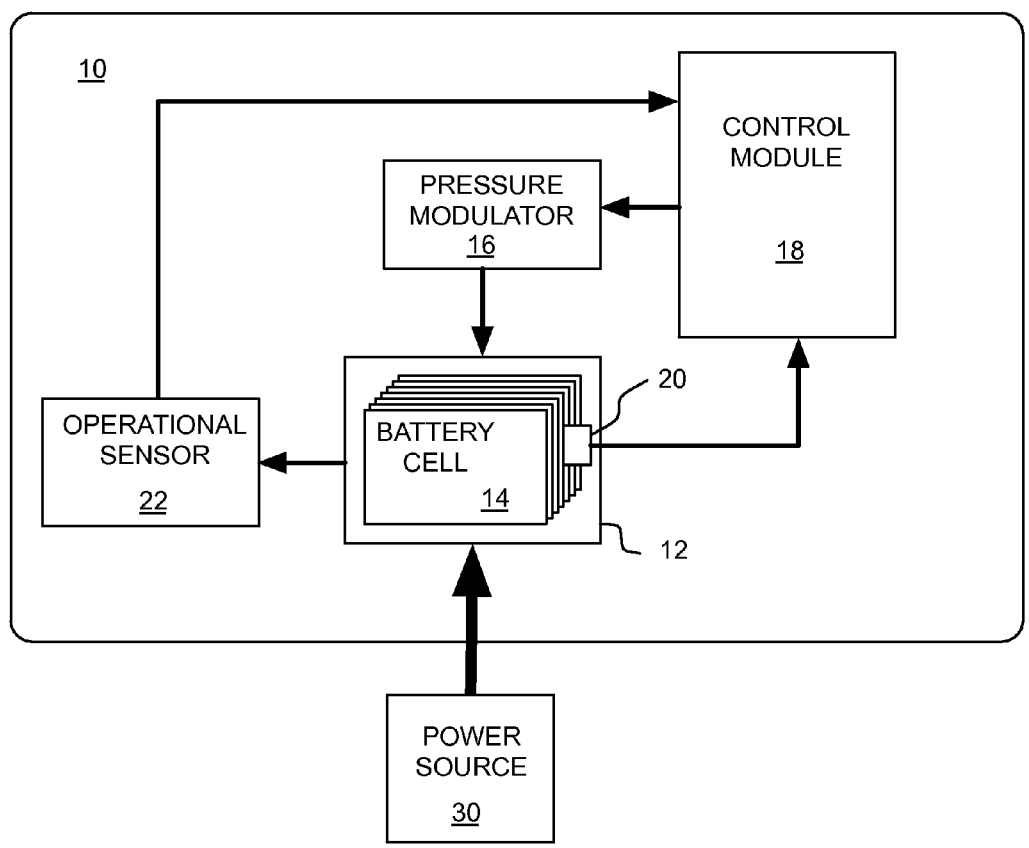
FIG. 1 is a block diagram of a battery assembly.

Referring to FIG. 1, a battery assembly 10 includes a battery stack 12 that includes a number of battery cells 14 with pressure layers (not shown) between respective pairs of adjacent battery cells. Rigid end plates at both ends of the stack apply a certain minimum pressure on the cells 14 within the stack 12. The pressure layers are configured to change thickness in order to change the amount of pressure applied to the battery cells 14. In the described embodiment, the pressure layers are coolant flow plates for containing a flow of coolant fluid that is used to both cool the battery cells as well as change the thickness of the flow plates, as described in more detail below.

The battery assembly 10 includes a pressure control system for controlling the pressure applied to the battery cells 14. The pressure control system uses a pressure modulator 16 to, in effect, modulate the thickness of the pressure layers to apply a corresponding modulation in the pressure applied to the battery cells 14 within the stack 12. The pressure modulator 16 can be of various types. For example, it can include a gear-driven positive displacement pump that flows coolant through flow plates between the battery cells 14. The pump is configured to prevent back flow through the pump, i.e., it only permits coolant flow in one direction through the flow plates. This allows steady bias pressure to be exerted by this unidirectional flow. By controlling the pump to adjust the flow rate of the coolant within some range higher or lower than the default unidirectional flow rate, the pressure modulator 16 can adjust the pressure exerted by the flow plates on the battery cells 14 with respect to the bias pressure. To facilitate this there is a restrictor that constricts the flow of fluid coming out of the battery assembly to increase the effectiveness of the pump in controlling the pressure within the battery assembly.

An alternative approach, which does not use pump speed to control pressure involves pressurizing the entire coolant system. According to this approach, the coolant system is a closed pressurized system. The pump operates at a predetermined rate to achieve effective cooling and a separate mechanism is provided to modulate the pressure of the coolant. For example, an actuator-controlled diaphragm or piston, which is on contact with the coolant, can be used to modulate the pressure applied to the coolant. This has the advantage of separating the cooling function (or flow rate) from the pressure control function.

The pressure control system also includes a control module 18 to control the pressure modulator 16 based on input received from one or more pressure sensors 20 and one or more operational sensors 22. The control module 18 includes circuitry (e.g., digital circuitry and/or analog circuitry) to perform a control procedure that ensures that the pressure modulator 16 is modulating the pressure within stack 12 based on one or more predetermined operational parameters of the battery cells 14. The one or more pressure sensors 20 can be distributed throughout the stack 12 (e.g., between a pressure layer and a battery cell). A pressure sensor 20 can include, for example, a strain gauge or other type of transducer that generates an electrical signal in response to an applied force. An electrical output signal from the pressure sensors 20 is provided to the control module 18, which monitors the pressure sensed by the sensors 20 to determine how much pressure is being applied to the battery cells 14 by the pressure modulator 16 and pressure layers within the stack 12.

The control module 18 also receives input from the one or more operational sensors 22 to monitor one or more operational parameters. Based on that monitoring, the control module 18 controls the pressure applied to the battery cells 14 by the pressure modulator 16. In some embodiments, the control module 18 adjusts the pressure as a function of one of the operational parameters. For example, one operational parameter that is used in some embodiments is the rate of charging of the battery cells 14, where the pressure is increased as the rate of charge increases according to a formula programmed into the circuitry of the control module 18. The control module 18 changes the pressure as a function of rate of charge, for example, according to a formula that defines a particular target value of pressure that should be applied for a particular value or range of values of a measurement of the rate of charge. The precise functional relationship specifying how the pressure is adjusted as a function of a particular operational parameter depends on the particular battery cell that is being used and can be determined empirically. The control module 18 includes a memory or storage device that stores code and/or parameters used to characterize the functional relationship being implemented. Another operational parameter that may affect the target pressure to be applied to the battery cells, and thus would also be represented in the functional relationship, is the temperature of the cells, which can be measured by using temperature sensors also located within the stack of battery cells.

An example of a scenario in which there is a particular target pressure that should be applied for a particular value of a measured operational parameter is when the battery assembly is being charged by a power source 30 using, for example a fast charging protocol such as the one described in U.S. Ser. No. 13/278,963 (Pub. No. 2012/0098481), entitled "Apparatus and Method for Rapidly Charging Batteries," filed on Oct. 21, 2011, and incorporated herein by reference. In this example, the operational sensors 22 measure charging rate. There is a charging rate threshold that identifies a point beyond which damage to the cells will occur and the life of the cells will be shortened. This threshold varies as a function of various parameters such as state of charge, charging rate, cell temperature, and pressure applied to the cells. During fast charging, the charging rate should be just below this threshold. By varying the pressure on the cells during the charging process, the threshold can be increased and the cells can be charged at a higher charging rate without negatively impacting the life or reliability of the cells. Thus, by modulating the pressure applied to the cells during fast charging, the time it takes to fully charge the cells can be reduced even further.

Figure 2A:
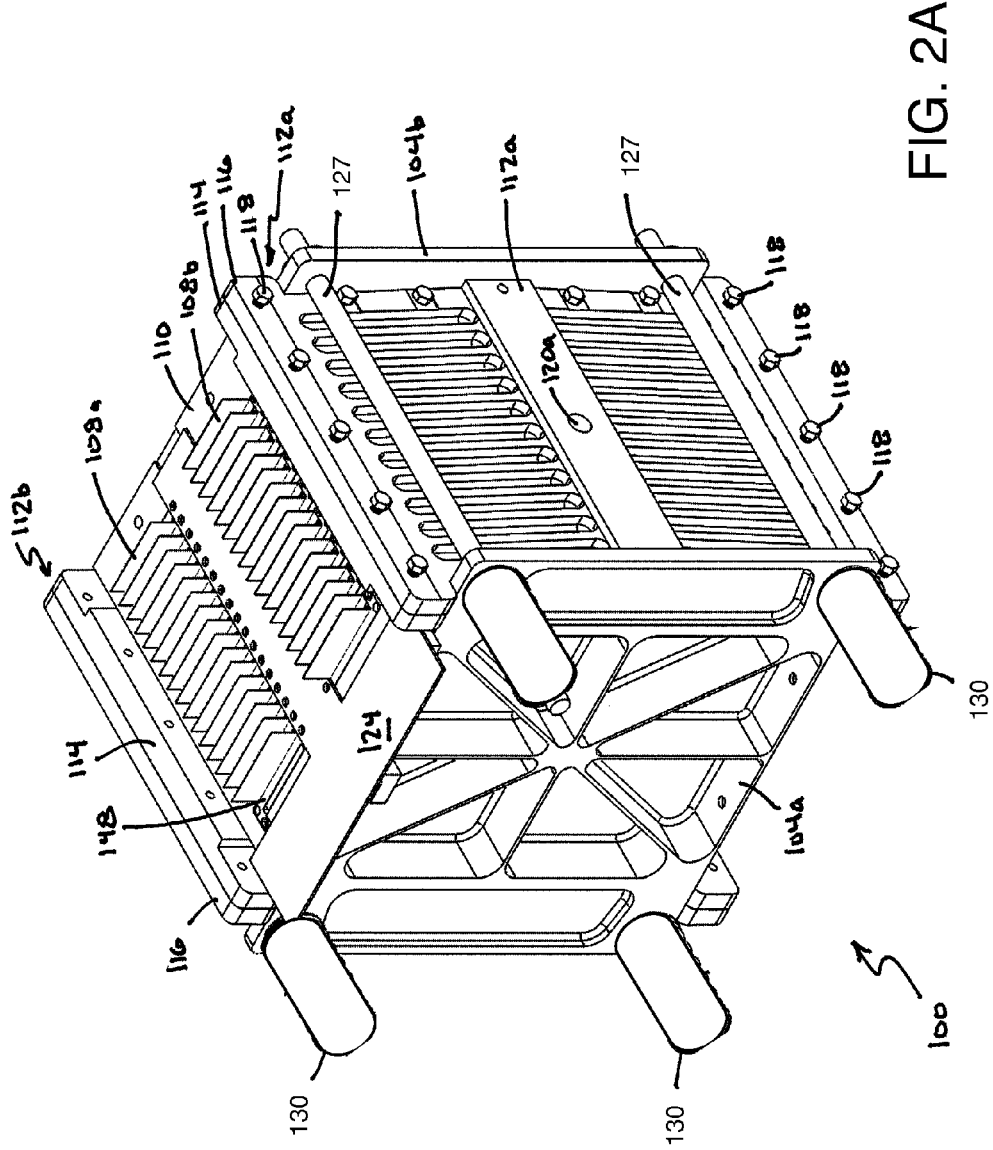
FIG. 2A is an auxiliary view of a battery assembly.
Figure 2B:
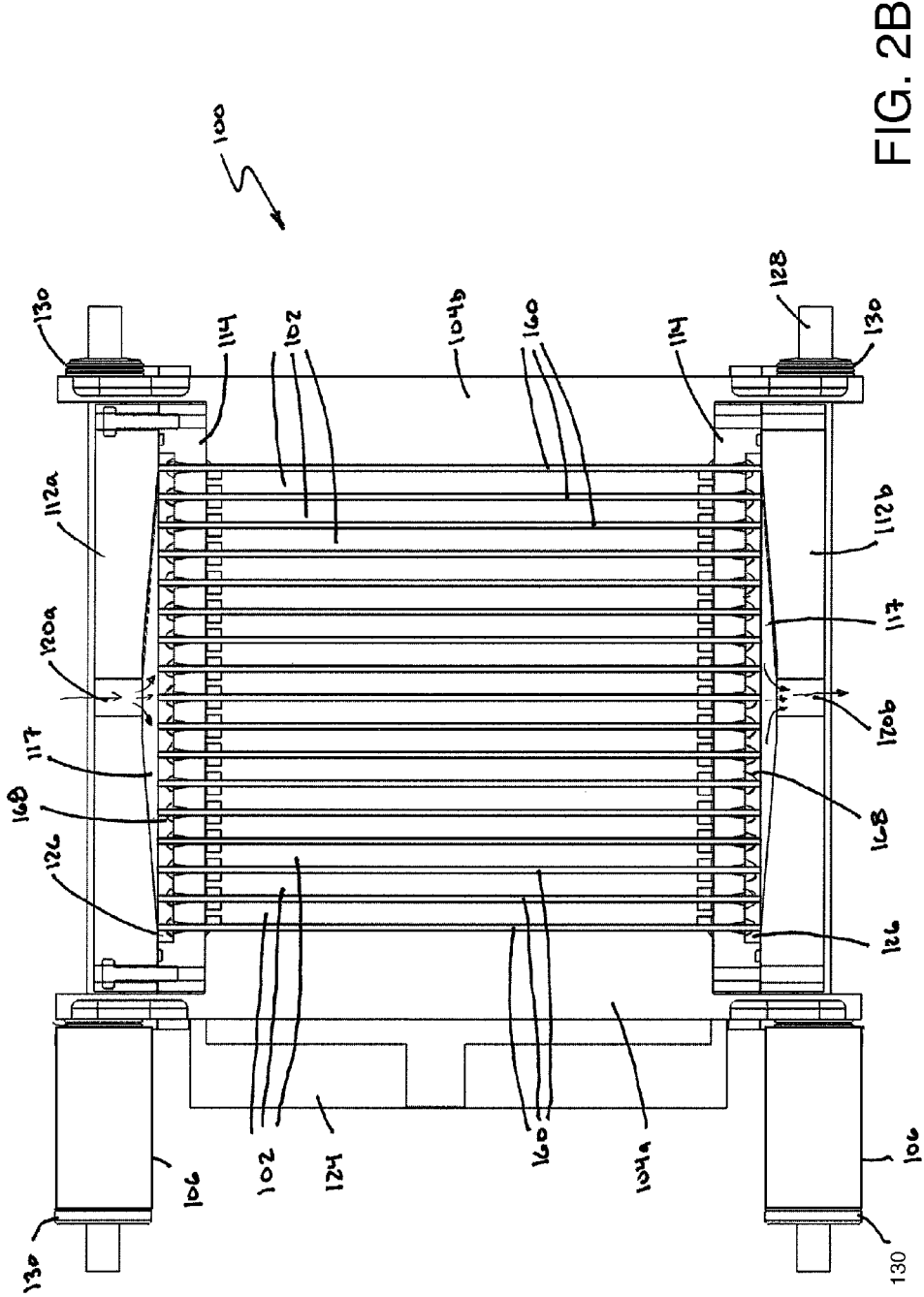
FIG. 2B is a cross-sectional view of the battery assembly shown in FIG. 2A.

Referring to FIGS. 2A and 2B, an exemplary embodiment of the battery assembly 10 is a liquid-cooled multi-cell battery assembly 100. The battery assembly 100 includes a stack of 16 rechargeable lithium-ion battery cells 102 clamped together by two rectangular-shaped end plates 104a and 104b. The end plates 104a and 104b, which have holes in each of their four corners, are mounted on four rods 127, with each rod 127 passing through a corresponding hole in each of the two end plates 104a and 104b. On each end of each rod 127 there is a retaining structure 130 that prevents each end plate from sliding further than a predetermined distance from the other end plate. The end plates held together by the rods form a rigid housing that presses against and applies pressure on the stack of battery cells. A stack of the battery cells 102 is contained within the battery assembly 100. In FIG. 2A, only their positive and negative terminals 108a and 108b, which extend through a wedge bus bar plate 110, are visible. The bus bar plate 110 holds bus bar clamps, which make up the bus that electrically interconnects the terminals of the battery cells.

In the illustrated embodiment, a pressure modulator and a coolant system both make use of the flow plates between the battery cells to both support a flow of coolant and apply pressure to the adjacent battery cells. Coolant is delivered to and from the flow plates by two manifolds 112a and 112b located on opposite sides of the stack of battery cells 102. Each manifold 112a and 112b includes a cover plate 114 and a back plate 116 secured together by two rows of bolts 118. Coolant introduced into one manifold 112a through an input port 120a flows between and cools the battery cells 102 in the assembly and is collected on the other side by the other manifold 112b, which has a corresponding exit port 120b. The battery assembly 100 also includes a control module implemented in circuitry on a circuit board 124 mounted on the bus bar plate 110 that includes circuitry of the control module 18 and any circuitry needed for coupling signals from the operational sensors 22 and managing operations of the battery assembly 100 including charging, discharging, and balancing of the battery cells 102 during use.

Figure 3:
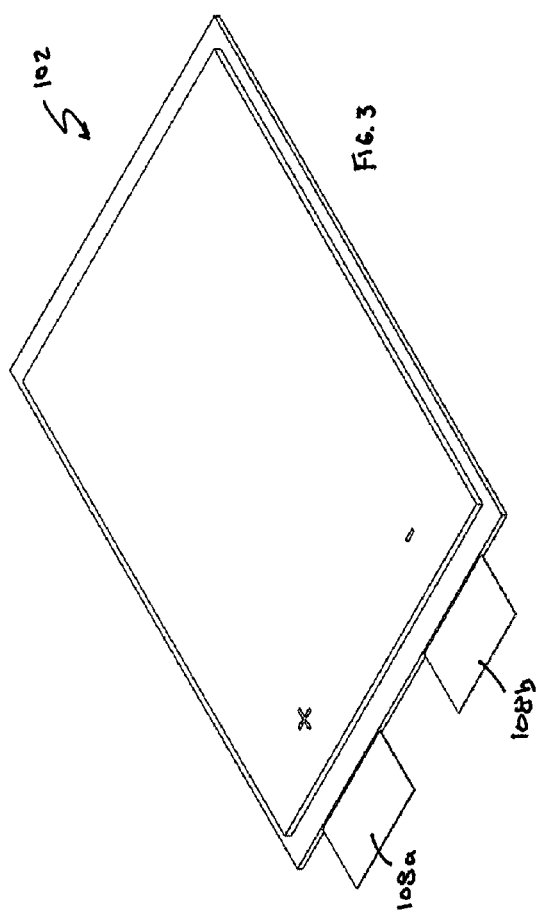
FIG. 3 illustrates a flat or prismatic battery cell used in the battery assembly of FIGS. 2A and 2B.

FIG. 3 shows one of the battery cells 102 that is contained within the battery assembly 100. In this example, the battery cell 102 is a laminated polymer pouch with a flat, thin geometry (also known as a "prismatic cell"). Two terminals 108a (the positive terminal) and 108b (the negative terminal) extend out of the edge of one end the pouch. Prismatic cells are commercially available from multiple sources. The nominal operating parameters of a prismatic cell will vary widely. But some typical values for the operating parameters might be: an output voltage of nominally 3.3 volts, and a capacity of 14-20 Ah. For optimal operation of a prismatic cell, an applied compressive pressure during operation should be in a particular range (e.g., about 35-50 kPa).

Figure 5B:
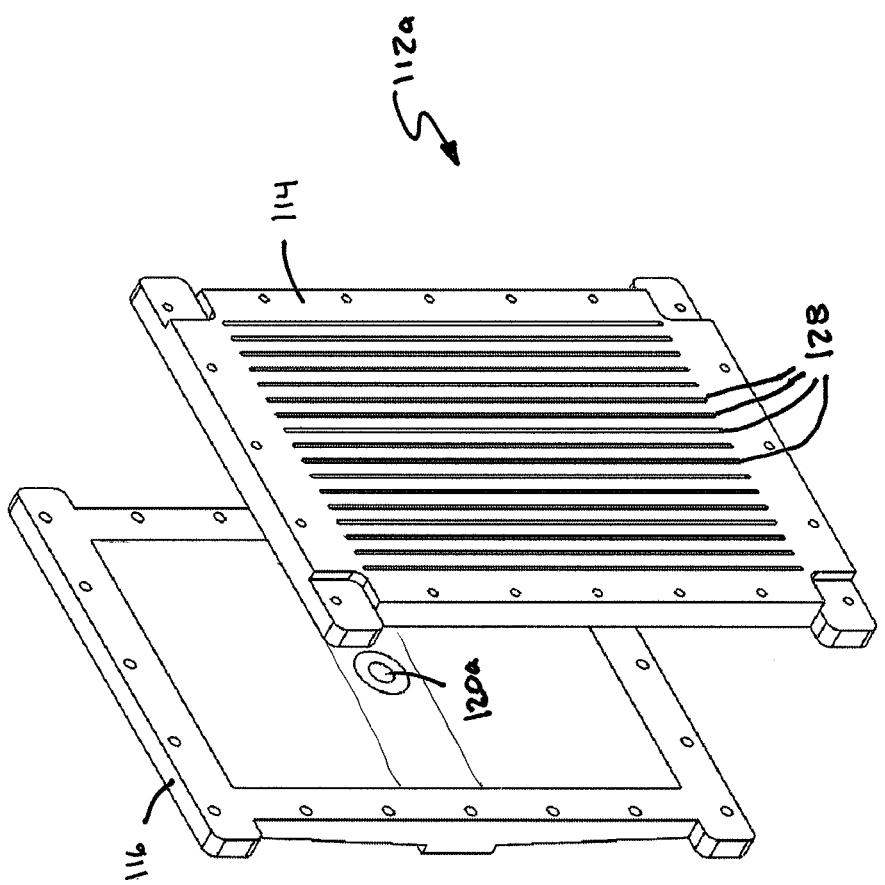

Referring again to FIG. 2B, the internal structure of battery assembly 100 is shown in cross-section. In each of the manifolds 112a and 112b, the cover plate 116 and back plate 114 define an internal chamber 117 for receiving the coolant that flows through the flow plates. Referring to FIGS. 5A and 5B, the inside surface of cover plate 116 is recessed with the surface tapering at a constant gradient from an outer location in toward the inlet/exit port 120a/b. The back plate 114 also includes a recessed region 126 on the side that faces the cover plate 116 when the manifold 112a is assembled. On the wall within recessed region 126 there is an array of equally spaced slots 128 through the back plate 114. Extending between the two manifolds 112a/b is an array of flow plates, provided here as corrugated flow plates 160, for carrying coolant between the battery cells from one manifold 112a to the other manifold 112b.

Figure 4:
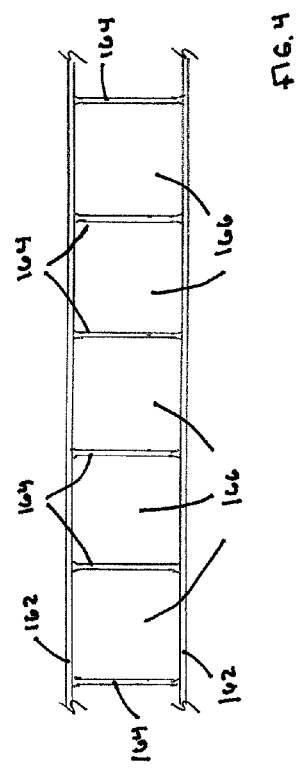
FIG. 4 shows a side view of a portion of a corrugated flow plate used in the battery assembly of FIGS. 2A and 2B.

Referring to FIG. 4, each corrugated flow plate 160 has two liquid impermeable side sheets 162 separated from each other by an array of equally spaced, parallel ribs 164 connecting one sheet to the other sheet. The array of ribs forms an array of parallel channels 166 extending in one direction inside of the flow plate and through which coolant is flowed. The ribs 164 prevent the flow sheet from collapsing when put under compressive forces. The impermeable side sheets 162 are flexible and will bulge outward in response to the increased pressure of the coolant and will thereby apply variable pressure to the battery cells. In the described embodiment, the corrugated flow plates are commercially available Coroplast™ sheets that are made of an extruded polypropylene polymer having a thickness of about 2 mm. Other thicknesses are commercially available, e.g. 2-10 mm.

Referring again to FIGS. 2B, 5A and 5B, the flow plates 160 fit into slots 128 in back plates 114 of the two manifolds 112a/b, with a flow plate 160 arranged in each slot 128. The slots 128 are sized so that the flow plates 160 fit snuggly into them. Flow plates 160 are oriented so that channels 126 within the flow plates 160 extend from one manifold to the other. Flow plates 160 pass through the slots 128 in the back plates 114 and extend into the chamber 117 defined within manifold 112. On the inside of manifold 112, there is an epoxy seal 168 along a slot 128 between the flow plate 160 and the back plate 114 that prevents coolant from leaking into the regions inside of the battery assembly where it would contact the cells. Each slot 128 has a tapered entrance on the side that is within the manifold and another smaller tapered entrance (not visible in the figures) on the opposite side. The smaller taper makes insertion of flow plate 160 into slots 128 during assembly easier. The larger taper on the inside facilitates a better seal between the flow plate 160 and the back plate 114 when epoxy is applied by drawing the epoxy into the tapered area and providing a larger surface area for forming the seal.

The sloped upper wall of the chamber 117 that is formed by the inside surface of cover plate 116 serves to reduce or prevent the Coanda Effect, which could result in some of the many flow channels within the flow plates not supporting a flow and containing stagnant fluid/coolant.

The separations between the flow plates provide spaces into which the battery cells are inserted during assembly. The distances between the flow plates are selected so as to provide a snug fit for the battery cells. This enables the compressive forces provide by the end plates to be effectively distributed throughout the stack of battery cells and all battery cells will be under bias pressure when the battery assembly is fully assembled, so that during operation (e.g., charging or discharging) the pressure modulator will be able to modulate the pressure, higher or lower, about this bias pressure. On the inside of the back plate 116 there is a channel 142 formed around the perimeter of the back plate 116. This channel 142 receives a flexible o-ring (not shown), which forms a seal when the cover plate 114 is bolted onto the back plate 116.

Battery cells 102 are arranged within the battery assembly 100 in alternating orientations, i.e., back-to-back, front-to-front. By alternating the battery cells 102, if the first cell will has its positive terminal on the right, then second cell (i.e., the second cell in the stack) will have its negative terminal on the right, the third cell will have its positive terminal on the right, etc. Thus, when an interface for a power supply or a device being powered is able to electrically connect a negative terminal of one battery cell with a positive terminal of a neighboring battery cell. In this way, terminal clamps of an interface electrically connect the cells in series so that the total output voltage of a battery assembly with N cells is N times the voltage of an individual cell (e.g. 3.3N volts).

Various materials can be used for various parts of the battery assembly. In some embodiments, end plates 104a and 104b are made of aluminum, and the manifolds 112a and 112b and the bottom cover are made of ABS (acrylonitrile butadiene styrene) or polypropylene, and the epoxy adhesive: is DP100 Plus from 3M. The coolant could be water or Fluorinert™, which is an electrically insulating coolant sold commercially by 3M. Of course, there are many other commercially available acceptable alternatives to these materials that could be used. In addition, the battery assembly can have any number of battery cells depending on the output voltage requirements of the application. Furthermore, mechanisms other than the end plates and rods described herein can be used to provide a rigid housing to compress the interleaved stack of battery cells and flow plates with a minimum bias pressure.

In addition, flow plates other than the corrugated structures are possible. The Coroplast™ flow plates are particularly convenient because they are commercially available, inexpensive, and have properties that are particularly appropriate for this application. However, there are other ways to design and fabricate the flow plates. For example a corrugated plate can be constructed by bonding a "wavy" sheet of material between two flat sheets of impermeable material. The resulting structure would look more like corrugated cardboard.

The piston or diaphragm mentioned above as a way of controlling pressure also provides a mechanism for monitoring the health of the cells. One mode of cell failure involves expansion of the cell pouch as a result of gas generated within the pouch. It is desirable to detect when this mode of failure is occurring so that corrective action can be taken. The expansion of a cell pouch pushes against the coolant flow plates and forces coolant out of the cell assembly. This, in turn, causes the piston and/or diaphragm to move outwards. The outward motion of the piston and/or diaphragm can be detected by a position sensor and will provide an indicator of this failure mechanism. In effect, the motion sensor detects a reduction in the volume of the coolant system within the battery assembly that results from the expansion a failing battery cell pouch.

It is to be understood that the foregoing description is intended to illustrate and not to limit the scope of the invention, which is defined by the scope of the appended claims. Other embodiments are within the scope of the following claims.

What is claimed is:

1. A method of operating a battery assembly that includes a plurality of rechargeable battery cells, the method comprising:
    monitoring one or more operational parameters of the plurality of battery cells;
    cooling the battery cells by flowing a coolant between neighboring battery cells within the plurality of battery cells;
    monitoring a pressure applied to the battery cells by the coolant flowing between neighboring battery cells; and
    dynamically varying the pressure applied to the plurality of battery cells to yield a monitored pressure having a target value that changes based at least in part on the one or more monitored operational parameters, wherein dynamically varying pressure applied to the plurality of battery cells involves dynamically varying pressure of the coolant flowing between neighboring battery cells to dynamically vary the pressure applied to the plurality of battery cells and wherein dynamically varying the pressure comprises applying a bias pressure to the plurality of battery cells and varying pressure applied to the plurality of battery cells relative to the bias pressure.

2. The method of claim 1, wherein the coolant is a liquid.

3. The method of claim 2, wherein dynamically varying the pressure comprises varying the pressure applied to the plurality of battery cells as a function of the one or more monitored operational parameters.

4. The method of claim 2, further comprising changing a flow rate of the coolant flowing between neighboring battery cells to vary pressure of the coolant flowing between neighboring battery cells.

5. The method of claim 2, wherein at least one of the monitored operational parameters is charging rate, state of charge, or temperature of the cells.

6. The method of claim 2, wherein at least one of the monitored operational parameters is charging rate.

7. The method of claim 2, wherein monitoring the one or more operational parameters includes monitoring a change in at least one of the operational parameters during charging of the plurality of battery cells.

8. The method of claim 2, further comprising detecting a change in a volume of a coolant region within the battery assembly.

9. The method of claim 2, wherein at least one of the monitored operational parameters is state of charge.

* * * * *